United States Patent Office 3,072,671
Patented Jan. 8, 1963

3,072,671
SUBSTITUTED BIS(4-THIAZOLIDINONES) AND
PROCESS THEREFOR
Gerhard Satzinger, Memingen, Allgau, Germany, assignor to Warner-Lambert Pharmaceutical Company, Morris Plains, N.J., a corporation of Delaware
No Drawing. Filed Mar. 6, 1961, Ser. No. 93,363
9 Claims. (Cl. 260—306.7)

The present invention relates to new and novel bis(4-thiazolidinones) of the formula:

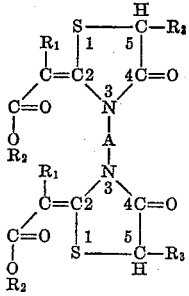

wherein $R_1$ is hydrogen, lower alkyl or aryl; $R_2$ is lower alkyl; $R_3$ is hydrogen or lower alkyl; and A is an alklylene radical having 1 to 6 carbon atoms,

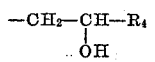

in which $R_4$ is an alkylene radical of 1 to 4 carbon atoms, or

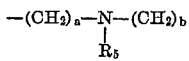

in which $a$ and $b$ are 1 to 3 and $R_5$ is a lower alkyl group. The present invention also relates to a method of preparing these substituted bis(4-thiazolidinones).

The term "lower alkyl" as used in the specification and in the claims refers to branched and straight chain aliphatic groups having 1 to 6 carbon atoms.

The substituted bis(4-thiazolidinones) of this invention have been found to have interesting pharmacological activity as analgesics, sedatives and choleretic agents. In use, they may be formulated with conventional pharmaceutical carriers to form such typical dosage units as tablets, capsules, solutions, suspensions, suppositories and the like.

It has now been found that the new and novel substituted bis(4-thiazolidinones) of this invention may be prepared by the reaction of a substituted 4-thiazolidinone of the formula:

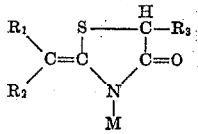

wherein $R_1$, $R_2$ and $R_3$ are as described hereinabove and M is an alkali metal, for example sodium or potassium, with compounds of the formula

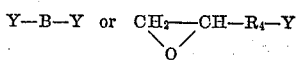

in which Y is halogen, for example chlorine, bromine or iodine, and B is an alkylene radical having 1 to 6 carbon atoms or a radical of the formula

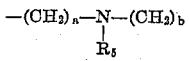

$a$, $b$, $R_4$ and $R_5$ being as described hereinabove.

The product of the reaction is a compound formed of two substituted 4-thiazolidinone nuclei joined through a linkage between the respective nitrogen atoms. Where the reactant with the substituted 4-thiazolidinone starting material is a compound of the formula Y-B-Y, the linkage joining the two nuclei is an alkylene radical having 1 to 6 carbon atoms or a radical of the formula

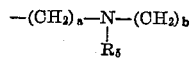

where the reactant is a compound of the formula

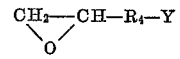

the linkage joining the two nuclei is a radical of the formula

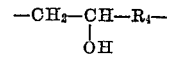

The reaction is carried out under anhydrous conditions by heating the reactants in an appropriate inert solvent such as methanol, ethanol, dimethylformamide and the like to a temperature of about 50 to about 100° C. The reaction time is normally about one-half to about three hours. For optimum yields, the reactants should be present in the molar proportions of 2 parts of the substituted 4-thiazolidinone to 1 part of the reactant of the formula

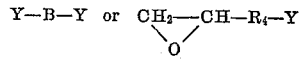

At the conclusion of the reaction, the product is recovered from the reaction mixture by crystallization.

The substituted 4-thiazolidinone starting materials of the formula:

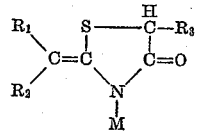

may be prepared as described in my application entitled "Substituted 4-Thiazolidinones and Process Therefor" (Case A), filed concurrently herewith, now application Serial No. 93,301 filed March 6, 1961, by the reaction of a nitrile of the formula:

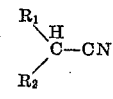

with a mercapto ester of the formula:

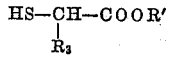

wherein R' is lower alkyl, in the presence of an aliphatic alcohol having 1 to 6 carbon atoms and an alkali metal.

The following examples are included in order further to illustrate the present invention:

EXAMPLE I 3,3'-(2-Hydroxytrimethylene)bis(2-Carbethoxymethylene-4-Thiazolidinone A mixture of 37 g. (0.2 mole) 2-carbethoxymethylene-4-thiazolidinone and 9.2 g. (0.1) mole epichlorohydrin is added to a solution of 4.6 g. (0.2 mole) sodium in 300 ml. absolute ethanol. The mixture is heated under reflux for one-half hour and then cooled to room temperature. Dilution with an equal volume of water results in the precipitation of light yellow crystals which are treated with 1N NaOH, filtered and washed with water. Recrystallization from dioxane/water yields 17 g. (40%) of 3,3'-(2-hydroxytrimethylene)bis(2-carbethoxymethylene-4-thiazolidinone, melting point 197° C.

*Analysis.*—Calc.: C, 47.43; H, 5.16; N, 6.51; S, 14.89. Found: C, 47.43; H, 5.30; N, 6.52; S, 14.91.

EXAMPLE II

*3,3'-Ethylenebis(2-Carbethoxymethylene-4-Thiazolidinone)*

To a stirred solution of 20.9 g. (0.1 mole) of the sodium salt of 2-carbethoxymethylene-4-thiazolidinone in 150 ml. of dimethylformamide are added 9.4 g. (0.05 mole) ethylene dibromide. The reaction mixture is heated to a temperature of 80° C. for one-half hour and is then cooled to room temperature. The cooled solution is filtered and evaporated to dryness and the residue is crystallized from dimethylformamide to yield 12.4 g. (62%) of 3,3'-ethylenebis(2-carbethoxymethylene-4-thiazolidinone) as yellow crystals, melting point 266° C.

*Analysis.*—Calc.: C, 47.98; H, 5.04; N, 6.99; S, 16.01. Found: C, 48.21; H, 5.16; N, 7.39; S, 15.56.

EXAMPLE III

*3,3'-[(Methylimino)diethylene]Bis(2-Carbethoxymethylene-4-Thiazolidinone)*

To a stirred freshly prepared solution of 0.1 mole di-(β-chloroethyl)methylamine in absolute ethanol (prepared by adding 19.1 g. of the amino hydrochloride to a solution of 2.3 g. sodium in 100 ml. absolute ethanol) is added a solution of 42 g. (0.2 mole) of the sodium salt of 2-carbethoxymethylene-4-thiazolidinone in 300 ml. absolute ethanol. The mixture is heated under reflux for 2 hours and is filtered to remove the sodium chloride. Upon cooling to −10° C., 25 g. (50%) of 3,3'-[(methylimino)diethylene]bis(2-carbethoxymethylene-4-thiazolidinone) separates. This is then dissolved in 700 ml. ethyl acetate and saturated with hydrogen chloride. Crystallization from 80% dioxane yields colorless crystals of the pure hydrochloride salt, melting point 225° C.

*Analysis (of the hydrochloride).*—Calc.: C, 46.19; H, 5.71; N, 8.51; S, 12.98; Cl, 7.18. Found: C, 44.71; H, 5.44; N, 8.59; S, 12.80; Cl, 7.21.

By procedures such as those set forth in the foregoing examples, other substituted bis (4-thiazolidinones) may be prepared, for example 3,3'-(2-hydroxytrimethylene)bis(2 - carbethoxymethylene-5-methyl-4-thiazolidinone), 3,3' - (2 - hydroxytrimethylene)bis[2 - (α - carbethoxybenzylidene) - 4 - thiazolidinone], 3,3'-trimethylenebis(2-carbethoxymethylene-5-ethyl-4-thiazolidinone), 3,3'-trimethylenebis[2 - (α - carbethoxybenzylidene)-4-thiazolidinone], 3,3' - [(methylimino)diethylene]bis[2-(α-carbethoxybenzylidene) - 5 - methyl-4-thiazolidone], 3,3'-[(methylimino)diethylene]bis[2 - (1 - carbethoxyethylidene)-5-methyl-4-thiazolidinone] and the like.

It is understood that the foregoing detailed description is given merely by way of illustration and that many variations may be made therein without departing from the spirit of my invention.

Having described my invention, what I desire to secure by Letters Patent is:

1. A compound of the formula:

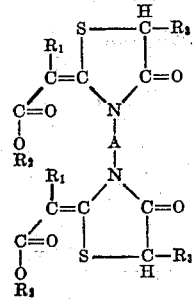

wherein $R_1$ is a member selected from the group consisting of hydrogen, phenyl and lower alkyl; $R_2$ is lower alkyl; $R_3$ is a member selected from the group consisting of hydrogen and lower alkyl; and A is a bridging member selected from the group consisting of those of the formula —$(CH_2)_n$—, where $n$ is 1 to 6,

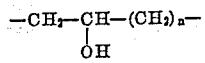

where $n$ is 1 to 4 and,

wherein $a$ and $b$ are 1 to 3 and $R_5$ is a lower alkyl group.

2. 3,3' - (2 - hydroxytrimethylene)bis(2 - carbethoxymethylene-4-thiazolidinone).
3. 3,3' - ethylenebis(2 - carbethoxymethylene - 4-thiazolidinone).
4. 3,3' - [(methylimino)diethylene]bis(2 - carbethoxymethylene-4-thiazolidinone).
5. 3,3' - [(methylimino)diethylene]bis(2-carbethoxymethylene-4-thiazolidinone) hydrochloride.

6. A method of preparing a compound of the formula:

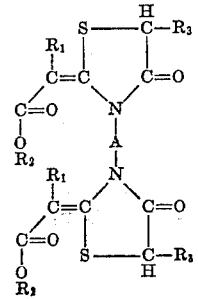

wherein $R_1$ is a member selected from the group consisting of hydrogen, phenyl and lower alkyl; $R_2$ is lower alkyl; $R_3$ is a member selected from the group consisting of hydrogen and lower alkyl; and A is a bridging member selected from the group consisting of those of the formula —$(CH_2)_n$—, where $n$ is 1 to 6,

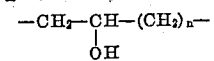

where $n$ is 1 to 4, and

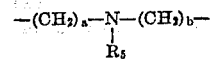

wherein $a$ and $b$ are 1 to 3 and $R_5$ is a lower alkyl group, which comprises heating to a temperature of about 50° C. to about 100° C. a mixture of a compound of the formula:

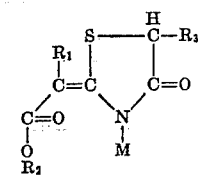

wherein M is an alkali metal and a member selected from the group consisting of

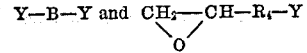

wherein $R_4$ is an alkylene radical of 1 to 4 carbon atoms, Y is halogen, B is a bridging member selected from the group consisting of those of the formula —$(CH_2)_n$—, where $n$ is 1 to 6, and

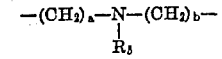

wherein $a$ and $b$ are 1 to 3 and $R_5$ is a lower alkyl group, and $R_4$ is an alkylene radical having 1 to 4 carbon atoms.

7. A method of preparing 3,3'-(2-hydroxytrimethylene) bis(2-carbethoxymethylene-4-thiazolidinone) which comprises refluxing an ethanol solution of 2-carbethoxymethylene-4-thiazolidinone and about one-half a molar equivalent of epichlorohydrin.

8. A method of preparing 3,3'-ethylenebis (2-carbethoxymethylene-4-thiazolidinone) which comprises heating to about 80° C. a dimethylformamide solution of 2-carbethoxymethylene-4-thiazolidinone and about one-half a molar equivalent of ethylene dibromide.

9. A method of preparing 3,3'-[(methylimino)diethylene]bis (2-carbethoxymethylene-4-thiazolidinone) which comprises refluxing an ethanol solution of 2-carbethoxymethylene-4-thiazolidinone and about one-half a molar equivalent of di-($\beta$-chloroethyl)-methylamine.

No references cited.